US007026442B2

(12) United States Patent
Nagare

(10) Patent No.: US 7,026,442 B2
(45) Date of Patent: Apr. 11, 2006

(54) STORAGE AND/OR TRANSPORTATION METHOD OF ALKOXY (POLY) ALKYLENE GLYCOL-CONTAINING MATERIALS

(75) Inventor: Koichiro Nagare, Kanagawa (JP)

(73) Assignee: Nippon Shokubai Co., Ltd., Osaka (JP)

( * ) Notice: Subject to any disclaimer, the term of this patent is extended or adjusted under 35 U.S.C. 154(b) by 664 days.

(21) Appl. No.: 10/059,437

(22) Filed: Jan. 31, 2002

(65) Prior Publication Data

US 2002/0169277 A1 Nov. 14, 2002

(30) Foreign Application Priority Data

Feb. 1, 2001 (JP) ............................ 2001-026111

(51) Int. Cl.
*C08F 6/00* (2006.01)

(52) U.S. Cl. .................................................. 528/502 R

(58) Field of Classification Search ............. 528/502 R
See application file for complete search history.

(56) References Cited

U.S. PATENT DOCUMENTS 6,166,112 A 12/2000 Hirata et al.

FOREIGN PATENT DOCUMENTS

| | | |
|---|---|---|
| JP | 11-71151 A | 3/1999 |
| JP | 11-228636 | 8/1999 |
| JP | 2000-154049 A | 6/2000 |

OTHER PUBLICATIONS

Catalog of Toho Chemical Industry Co., Ltd, published by Toho Chemical Industry Co., Ltd.

Catalog of Nippon Nyukazai Co., Ltd, published by Nippon Nyukazai Co., Ltd.

Takeshi Hirata, et al, "Method for storage and transport of alkoxypolyalkylene glycols for manufacture of cement dispersants", Database accession No. 133:8285 & JP 2000 154049 A (Nippon Shokubai Kagaku Kogyo Co., Ltd. Japan) Jun. 6, 2000.

Takeshi Hirata, et al., "Solutions for polycarboxylic acids with good storage stability and method for storing them for cement additives", Database accession No. 133:21357 & JP 2000 159973 A (Nippon Shokubai Kagaku Kogyo Co., Ltd., Japan) Jun. 13, 2000.

*Primary Examiner*—Edward J. Cain
(74) *Attorney, Agent, or Firm*—Sughrue Mion, PLLC

(57) ABSTRACT

A storing and/or transferring method of an alkoxy(poly) alkylene glycol-containing material for cement additive polymer which comprises a step of filling a vessel, a step of storing and/or transferring and a step of drawing out, in that order, said alkoxy(poly)alkylene glycol being represented by the following general formula (1);

$$R^1O(R^2O)_nH \qquad (1)$$

in the formula, $R^1$ represents a hydrocarbon group containing 1 to 30 carbon atoms, $R^2O$ group represents an oxyalkylene group containing 2 to 18 carbon atoms and each $R^2O$ group may be the same or different and n represents the average number of moles of the oxyalkylene groups represented by $R^2O$ as added and is a number of 0 to 300, and said step of storage and/or transfer being carried out at a temperature not higher than the solidifying point of the material for cement additive polymer.

8 Claims, 1 Drawing Sheet

STORAGE AND/OR TRANSPORTATION METHOD OF ALKOXY (POLY) ALKYLENE GLYCOL-CONTAINING MATERIALS

TECHNICAL FIELD

The present invention relates to a storing and/or transferring method of alkoxy(poly)alkylene glycol-containing materials for cement additive polymer and to a production method of cement additives using that method.

BACKGROUND OF THE INVENTION

Alkoxy(poly)alkylene glycols, for example, esterified with such an unsaturated monomer as (meth)acrylic acid, give (meth) acrylic ester monomers, which are used suitably as raw materials for cement additive polymer. In cases the alkoxy(poly)alkylene glycols are unsaturated alcohol-alkylene oxide adducts, they can also be used as raw materials for cement additive polymer. Such cement additive polymers can suitably be used not only as cement additives (cement dispersants) but also as dispersants for pigments such as calcium carbonate, carbon black and ink, scaling inhibitors, dispersants for gypsum-water slurries, dispersants for coal-water slurries (CWMs), thickening agents and like chemical products.

Meanwhile, alkoxy(poly)alkylene glycols are produced, for example, by subjecting an alcohol and an alkylene oxide, such as ethylene oxide and propylene oxide to addition under alkaline conditions. Such alkoxy(poly)alkylene glycols generally stored and/or transferred in a vessel before they are used as raw materials for cement additive polymer. For example, they are stored for a while or for along time before until polymer production or, when the plant for alkoxy(poly)alkylene glycol production is remote from the plant for monomer or polymer production, they are to be transferred.

However, alkoxy(poly)alkylene glycols generally used as raw materials for polymer production are readily oxidizable in an atmosphere of air. When they occur as solid at ordinary temperature, such alkoxy(poly)alkylene glycols are filled into vessels while they are still at high temperatures after production thereof by alkylene oxide addition to alcohols and therefore still occur as liquids and, for making it easy to draw out them from the vessels, they are stored and/or transferred in a heat insulation so that they may remain in a liquid state. When maintained at an elevated temperature for a certain period, the alkoxy(poly)alkylene glycols will be oxidized, resulting in increases of peroxide value (POV) and, in the case of alkoxy(poly)alkylene glycols having an unsaturated bond, polymerization reactions may occur, leading to form gel-like matter formation. In cases where the alkoxy(poly)alkylene glycols are converted to (meth) acrylic ester monomers by esterificating with (meth) acrylic acid, too, the possibility of gel-like matter formation during the esterification becomes high. Furthermore, the alkylene oxide adducts may be thermally decomposed or, in the case of (meth) acrylic ester monomers, these may also be hydrolyzed. The reaction formula illustrating the thermal decomposition of an unsaturated alcohol-alkylene oxide adduct and the reaction formula illustrating the hydrolysis of a (meth) acrylic ester monomer are shown below by way of example as formulas (1) and (2):

$$H_2C{=}C(R)CH_2CH_2O(CH_2CH_2O)nH \rightarrow H_2C{=}CH(R)CH{=}CH_2+HO(CH_2CH_2O)nH \quad (1)$$

$$H_2C{=}C(R)CO(OCH_2CH_2)nOCH_3+H_2O \rightarrow H_2C{=}C(R)COOH+H(OCH_2CH_2)nOCH_3 \quad (2)$$

Such troubles occurring during storage and/or transfer of an alkoxy(poly)alkylene glycol result in a decreased purity of the polymer produced therefrom, in an increased impurity content, hence a deterioration in quality thereof, and/or in a deterioration in quality or performance of the chemical product produced from such polymer. For example, if an unsaturated alcohol-alkylene oxide adduct is thermally decomposed, the desired molecular weight will not be obtained any longer in producing cement additive polymer therefrom. Further, if such polymer is used in preparing a cement additive, the content of polyethylene glycol (PEG), which causes an increased air content in cement compositions, will increase, possibly causing troubles such as decreases in strength due to increased air contents in hardened cement structures and, in addition, the content of the active ingredient polymer will decrease, resulting in decreases in the water reducing and other performance characteristics required of the cement dispersant. Furthermore, in cases where R in the above formula (1) is H, for instance, isoprene may be produced; the odor of isoprene will impair the working environment or the product isoprene will be polymerized to form impurities or copolymerized with the intended polymer to lower performance characteristics of the product.

A cement additive containing cement additive polymer derived from an alkoxy(poly)alkylene glycol improves the flow ability of a cement composition and, at the same time, improve the strength and durability of hardened products. When, however, it is contaminated with impurities or the polymer is deteriorated in its performance characteristics or quality, the resulting hardened products, such as civil engineering or building structures, may show lowered levels of strength and durability, whereby such problems as decreased safety and/or increases in repairing cost may possibly be caused.

In JP Kokai 2000-154049, there is disclosed a storing and/or transferring method of alkoxypolyalkylene glycols in vessels in an inert gas-substituted atmosphere and/or with a radical scavenger added. However, there is room for further investigation concerning the temperature and pressure in the steps of filling, storing/transferring and drawing out.

It is an object of the present invention, which has been made in view of the above-mentioned state of the art, to provide a storing and/or transferring method of an alkoxy (poly)alkylene glycol-containing material for cement additive polymer by which the gel-like matter formation and/or decomposition reaction can be satisfactorily inhibited and, as a result, troubles can be prevented from occurring in the production process and the performance characteristics or quality of cement additive and various chemical products can be satisfactorily prevented from being deteriorated.

SUMMARY OF THE INVENTION

The present invention provides a storing and/or transferring method of an alkoxy(poly)alkylene glycol-containing material for cement additive polymer which comprises a step of filling a vessel, a step of storing and/or transferring and a step of drawing out, in that order, said alkoxy(poly)alkylene glycol being represented by the following general formula (1);

$$R^1O(R^2O)_nH \quad (1)$$

in the formula, $R^1$ represents a hydrocarbon group containing 1 to 30 carbon atoms, $R^2O$ group represents an oxyalkylene group containing 2 to 18 carbon atoms and each $R^2O$ group may be the same or different and n represents the average number of moles of the oxyalkylene groups represented by $R^2O$ as added and is a number of 0 to 300, and said step of storage and/or transfer being carried out at a temperature not higher than the solidifying point of the material for cement additive polymer.

The present invention also relates to a method of producing a (meth)acrylic ester monomers for cement additive which comprises esterifying, with (meth)acrylic acid, said alkoxy(poly)alkylene glycol stored and/or transferred by said method.

The present inventors made intensive investigations in an attempt to efficiently produce various polymers, such as high-quality cement additive polymer and, as a result, noticed (1) that those alkoxy(poly)alkylene glycols which are to be used as materials for cement additive polymer and so forth are readily oxidizable in an air atmosphere and, in particular immediately after production thereof, they are at high temperatures and, when stored or transferred as such, they retain high temperatures to a certain extent, so that their peroxide value (POV) increases, leading to gel-like matter formation and (2) that they undergo hydrolysis and/or thermal decomposition, and in order not to occur such troubles, namely, the inventors found that it was effective to contrive so as to prevent POV from increasing and the decomposition reactions from occurring. Specifically, concerning a storing and/or transferring method of an alkoxy(poly)alkylene glycol-containing material for cement additive polymer which comprises a step of filling a vessel, a step of storage and/or transfer and a step of drawing out in that order, they found that the above problems can be successfully solved when (1) the step of storage and/or transfer is carried out at a temperature not higher than the solidifying point of the alkoxy(poly)alkylene glycol-containing material for cement additive polymer, (2) the step of drawing out is carried out in a manner such that the material for cement additive polymer can easily be drawn out from the vessel and (3) the step of filling a vessel is carried out under conditions such that the oxygen concentration in the vessel can be reduced. Based on these findings, they have now completed the present invention. They also found that, since polymers obtainable by using those raw materials stored and/or transferred by such method show high quality, these polymers can suitably be used as cement additive polymer.

DETAILED DESCRIPTION OF THE INVENTION

Figure 1:
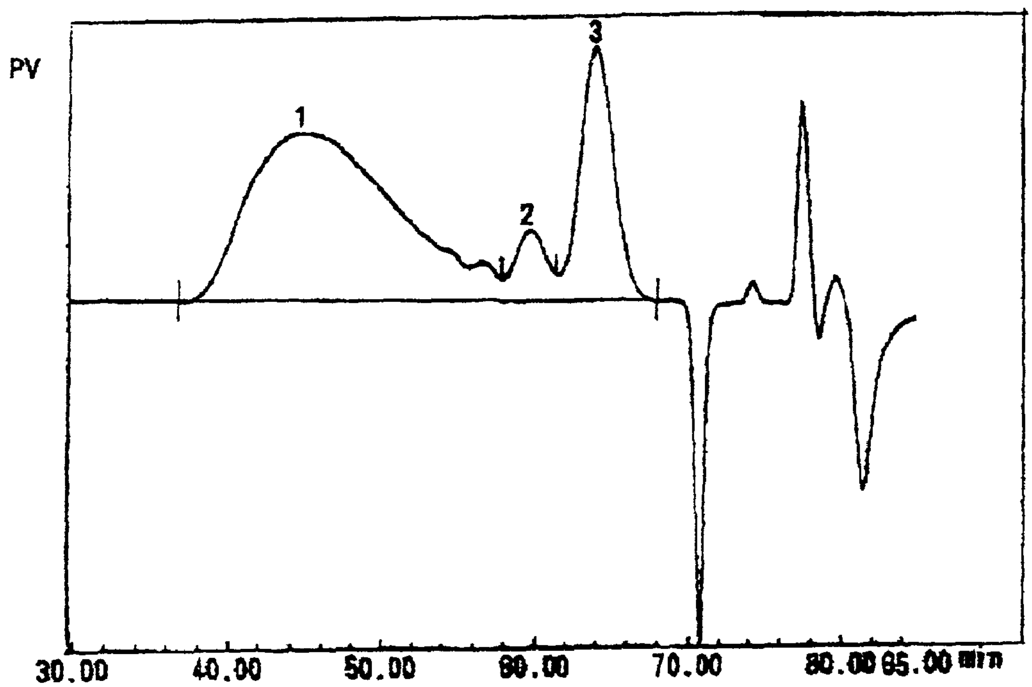
FIG. 1 is a GPC chart of the aqueous polymer solution (A3) obtained in Example 3.

In the following, the present invention is described in detail.

According to the storing and/or transferring method of alkoxy(poly)alkylene glycol-containing material for cement additive polymer in accordance with the present invention, the alkoxy(poly)alkylene glycol to be used is represented by the above general formula (1). Such alkoxy(poly)alkylene glycol may be used by one single species or a combination of two or more species. Such compound is preferably comprised as a staple component of the material for said cement additive polymer. In this case, the material for cement additive polymer may contain, or be free of, another additional component. The alkoxy(poly)alkylene glycol is converted, for example, to a (meth)acrylic ester monomer by esterification with (meth)acrylic acid or a like unsaturated monomer, and the resulting monomer is suitably used as a raw material for cement additive polymer. In cases where the alkoxy(poly)alkylene glycol is an unsaturated alcohol-alkylene oxide adduct, this can be used also as a raw material for cement additive polymer. As the unsaturated alcohol-alkylene oxide adduct, there may be mentioned, among others, alkylene oxide adducts derived from such alcohols as allyl alcohol, methallyl alcohol, 3-buten-1-ol, 3-methyl-3-buten-1-ol, 3-methyl-2-buten-1-ol and 2-methyl-3-buten-2-ol. Although the materials for cement additive polymer, which are to be treated in accordance with the present invention, are suited for use as raw materials for cement additive polymer, they can also be used as raw materials for the production of various chemical products.

Wherein the above general formula (1), $R^1$ represents a hydrocarbon group containing 1 to 30 carbon atoms, each $R^2O$ group may be the same or different and represents an oxyalkylene group containing 2 to 18 carbon atoms and n represents the average number of moles of the added oxyalkylene groups represented by $R^2O$ and is a number of 0 to 300. In a preferred embodiment, $R^2O$ represents an oxyalkylene group containing 2 to 8 carbon atoms and n is a number of 10 to 200. The "average number of moles of the added" means the mean value of the number of moles of the repeating unit in each mole of the compound.

If $R^1$ contains over 30 carbon atoms and/or $R^2O$ contains over 18 carbons atoms, the solubility in water of the polymers obtainable by using the (meth)acrylic ester monomer or unsaturated alcohol-alkylene oxide adduct as a raw material for the production thereof will become decreased and, when such polymers are used as cement additives and the like, the intended performance characteristics thereof, namely cement dispersing capacity and soon, may possibly be deteriorated. If n described formula exceeds 300, the reactivity of the compound represented by general formula (1) with (meth)acrylic acid will possibly lower.

The suitable range of the number of carbon atoms contained in $R^1$ or $R^2O$, is selected according to the performance and other characteristics required of the cement additives. As for $R^1$, for instance, it may be an alkyl group such as methyl, ethyl, n-propyl, isopropyl, n-butyl, tert-butyl, pentyl, hexyl, octyl, nonyl, 2-ethylhexyl, decyl, dodecyl, undecyl, tridecyl, tetradecyl, pentadecyl, hexadecyl, heptadecyl, octadecyl, nonadecyl, eicosyl, heneicosyl or docosyl; an aryl group such as phenyl; an alkylphenyl group such as benzyl or nonylphenyl; a cycloalkyl group such as cyclohexyl; an alkenyl group such as vinyl, allyl, 3-butenyl or 3-methyl-3-butenyl; or an alkynyl group. Among these, $C_{1-18}$ straight or branched alkyl groups and aryl groups are preferred, and methyl, ethyl, propyl, butyl and phenyl groups are more preferred.

As the described group $R^2O$, there may be mentioned, among others, oxyethylene, oxypropylene, oxybutylene and oxystyrene and, among these, oxyethylene, oxypropylene and oxybutylene are preferred. $R^2O$ is the repeating unit constituting the compound represented by the general formula (1) and the repeating units may be the same or different. In cases where the compound has two or more different repeating unit species, the mode of addition of the respective repeating units is not particularly restricted but includes block or random.

The range of the above-mentioned number n is to be selected according to the performance and other characteristics required of the cement additive and, for example, n is preferably 2 to 300, more preferably 5 to 200, still more preferably 8 to 150. For use as thickening agents, for instance, n is preferably 10 to 250, more preferably 50 to 200.

When the above number n is 0, the above group $R^1$ is preferably a hydrocarbon group containing not less than 4 carbon atoms from the viewpoint of water solubility and/or boiling point. Thus, when n is 0, (meth)acrylic ester monomer is produced upon esterification reaction of the alkoxy (poly)alkylene glycol with such an unsaturated monomer as (meth)acrylic acid under dehydration as mentioned later herein and the alcohol, in particular methanol or ethanol, evaporates together with the byproduct water or is dissolved in the byproduct water due to its low boiling point; therefore, a part of the alkoxy(poly)alkylene glycol material is distilled off from the reaction system, causing a decrease in the yield of the desired (meth)acrylic ester monomer. This should be prevented.

In the storage and/or transfer method, according to the invention, "storage" means a procedure comprising placing and storing a substance in a storage vessel for a while or continuously for a long period of time and "transfer" means a procedure involving transfer of a substance and comprising moving a substance using a container, drum, oil can or plastic tank or a like vessel for transfer and is also called "transportation". The storage vessel and the transfer vessel respectively include not only containers, drums and the like but also tanks on the ground, underground tanks and the like. The material of construction of such vessels is preferably one capable of maintaining a tightly closed state during storage and/or transfer and hardly undergoing deterioration or degeneration in the temperature range of −50° C. to 150° C. Suited for use are, for example, stainless steel (SUS) species, aluminum and iron. In the practice of the present invention, the vessels may be used for both storage and transfer of alkoxy(poly)alkylene glycol-containing material for cement additive polymer, or for either storage or transfer thereof alone.

The method of storage and/or transfer according to the present invention comprises a step of filling a vessel, a step of storage and/or transfer and a step of drawing out, in that order. In the step of filling a vessel, a storage vessel or transfer vessel, is partly or fully filled with a material for cement additive polymer and, in the vessel, the void space constitutes a gaseous phase portion and the material for cement additive polymer constitutes a liquid phase portion. In the storage and/or transfer step, the vessel filled with the material for cement additive polymer is stored or transferred and, in the step of drawing out from the vessel, the material for cement additive polymer is partly or wholly drawn out from the storage vessel or transfer vessel after the step of storage and/or transfer.

According to the present invention, said step of storage and/or transfer is carried out at a temperature not higher than the solidifying point of the material for cement additive polymer. When such measure is taken, the alkoxy(poly) alkylene glycol will no more contact with oxygen in air at high temperatures and, in addition, since the material for cement additive polymer becomes a solid, the chance of the alkoxy(poly)alkylene glycol contacting with oxygen in air is reduced. As a result, the peroxide value (POV) is prevented from increasing due to oxidation and, thus, the effects of the present invention are produced. In cases where the material for cement additive polymer comprises an alkoxy(poly) alkylene glycol alone, the solidifying point of the material for cement additive polymer is the solidifying point of the alkoxy(poly)alkylene glycol. In cases where the material contains another component or other components, the solidifying point of the material means the solidifying point (also called pour point) of the mixture of the alkoxy(poly)alkylene glycol and the other component or components. When the material for cement additive polymer comprises one alkoxy (poly)alkylene glycol species alone, the above-mentioned solidifying point of the alkoxy(poly)alkylene glycol is the solidifying point of that alkoxy(poly)alkylene glycol species and, when the material contains two or more species, the above solidifying point means the solidifying point (also called pour point) of the mixture of two or more alkoxy (poly)alkylene glycol species.

Available for lowering the temperature of the material for cement additive polymer to a level not higher than the solidifying point thereof are, for example, the method comprising allowing the alkoxy(poly)alkylene glycol-containing material for cement additive polymer after production and transfer to a vessel to cool to ordinary temperature about 20° C. without heat insulation and the method comprising cooling the material by flowing a cooling medium through a jacket. When the alkoxy(poly)alkylene glycol having a solidifying point not lower than 30° C. is used, it is desirable that no heat insulation be used. In accordance with the present invention, the material for cement additive polymer partly or wholly is at a temperature not higher than the solidifying point and, for sufficiently preventing POV from increasing, it is preferred that the whole of the material be at a temperature not higher than the solidifying point. Preferably, the above measure is taken throughout the whole period of the storage and/or transfer step, although it may be taken during a certain period in that step.

The solidifying point of an alkoxy(poly)alkylene glycol increases as the weight average molecular weight or the number n in general formula (1) increases. Taking, as examples of alcohol-ethylene oxide adducts and unsaturated alcohol-ethylene oxide adducts, relationships between the solidifying point and weight average molecular weight or the number n in general formula (1) are shown below in Table 1.

TABLE 1

| | Alcohol-ethylene oxide adduct Production Example | | | Unsaturated alcohol-ethylene oxide adduct Production Example | |
|---|---|---|---|---|---|
| Production Example | 1 | 2 | 3 | 4 | 5 |
| Weight average molecular weight | 472 | 1132 | 5312 | 526 | 2286 |
| Number n | 10 | 25 | 120 | 10 | 50 |
| Solidifying point [° C.] | 10 | 40 | 55 | 17 | 52 |

According to the present invention, the step of drawing out is preferably carried out by melting the material for cement additive polymer by raising the temperature to a level not lower than the solidifying point thereof. By doing so, it becomes possible to draw out the material for cement additive polymer from the vessel simply. On that occasion, the material is warmed. The warming is preferably carried out in a manner such that troubles can be satisfactorily prevented from occurring in the production step and the performance and quality characteristics of various chemical products from deteriorating, namely such that the increase in POV and decomposition reactions can be prevented as far as possible. For example, the material for cement additive polymer is preferably melted at a temperature not higher by 150° C., more preferably not higher by 110° C., still more preferably not higher by 70° C., than the solidifying point thereof.

The step of filling a vessel according to the present invention is not particularly restricted. Preferably, however, a vessel purged with an inert gas, such as nitrogen, is filled with the alkoxy(poly)alkylene glycol-containing material for cement additive polymer to about 80 to 90% of the capacity thereof and the resulting gaseous phase portion is further pressurized with an inert gas. The above-mentioned step of drawing out is preferably carried out after melting the material for cement additive polymer by raising the temperature to a level not lower than the solidifying point thereof while the vessel is kept in a tightly closed state. When, in the step of filling a vessel, a vessel is filled with the material for cement additive polymer and the temperature of the material for cement additive polymer is lowered to the solidifying point or below so that the step of storage and/or transfer of the material for cement additive polymer may be carried out at a temperature not higher than the solidifying point thereof, the pressure within the vessel will be reduced as the volume of the material for cement additive polymer decreases and air may enter the vessel. When the vessel is tightly closed while pressurizing with an inert gas, however, the vessel inside pressure becomes not lower than atmospheric pressure, hence air can no more enter the vessel inside. In addition, the content of air in the gaseous phase portion in the vessel decreases, so that the increase in POV can effectively be prevented. In this case, if the material for cement additive polymer is melted, in the step of drawing out, by raising the temperature to a level not lower than the solidifying point of the material after the vessel is opened, the material will be warmed in such a state that the vessel contains air introduced and, accordingly, the POV will possibly increase. Consequently, by melting the material for cement additive polymer at a temperature not lower than the solidifying point thereof while the vessel is in a tightly closed condition, it becomes possible to carry out the step of drawing out while preventing the increase in POV.

In the above step of drawing out, it is also preferable that the heating be carried out to an extent such that the pressure within the gaseous phase portion becomes higher than the pressure attained therein at the time of tight closure of the vessel in the step of filling. This makes it possible to melt the material for cement additive polymer with more certainty. In the step of storage and/or transfer according to the invention, the material for cement additive polymer is at a temperature not higher than the solidifying point thereof and, the vessel is in a tightly closed state under pressurization with an inert gas in the step of filling a vessel in a preferred embodiment. In that case, the gaseous phase portion in the vessel is in a state under more reduced pressure as compared with the time of tight closure under pressurization. For raising the temperature to a level not lower than the solidifying point of the material for cement additive polymer in the step of drawing out, it is preferable to provide the vessel with an external jacket and heat the vessel by passing steam or warm water through the jacket. When the solidified material for cement additive polymer is heated from outside the vessel, the portion in contact with the vessel, which serves as a heating surface, first melts, making an upper layer liquid with the progress of melting, with the unmelted portion forming a center lower layer; and, finally, the whole is melted. To carry out the above-mentioned process of melting, if the vessel temperature is measured by means of a thermometer fitted on the wall of the vessel, the temperature of the melted portion in the vicinity of the vessel wall will be measured; there is the possibility that the material for cement additive polymer in the vessel is not yet wholly melted. Generally, a container is used as the vessel for storing and/or transferring the material efficiently and in large quantities. On that occasion, however, there is no means for confirming that the material for cement additive polymer inside the vessel has surely been melted. In such a case, it will become possible to melt the material for cement additive polymer with more certainty when the step of drawing out is carried out by measuring the pressure of the gaseous phase portion and heating the vessel until the pressure of the gaseous phase portion increases to a level higher than the pressure at the time of tight closure of the vessel in the step of filling; this is a particularly preferred embodiment.

The inert gas to be used in the above step of filling a vessel is not particularly restricted but includes, among others, nitrogen gas, helium gas, argon gas and the like. Among these, nitrogen gas and helium gas are preferred in view of the cost and ease of handling thereof. Nitrogen gas is more preferred. As for the method of purging the vessel inside with an inert gas, the procedure comprising pressurizing the vessel by feeding the same with an inert gas, followed by discharging the gas, for instance, is repeated several times. This can effectively reduce the content of air in the vessel. The pressure for pressurizing the vessel on that occasion is preferably 0.01 to 1.0 MPa, more preferably 0.02 to 0.4 MPa. As for the pressure at the time of discharging the inert gas, it is preferable that the depressurization is carried out to 0 to 0.01 MPa. The number of repetitions of pressurization and discharging is not less than one, preferably not less than three, more preferably not less than five.

For sufficiently purging the vessel with an inert gas, it is preferable to purge the vessel with an inert gas in advance prior to filling the vessel with the raw material in question. The filling percentage in the step of filling a vessel with the alkoxy(poly)alkylene glycol-containing material for cement additive polymer is preferably 50 to 98%, more preferably 80 to 95%, of the capacity. If the percentage is less than 50%, the efficiency of use of the vessel will become low and, when it is above 95%, a problem concerning vessel pressure resistance against thermal expansion may arise. In the step of filling a vessel with the above material, it is preferred that a safety valve be provided or a valve belonging to the gaseous phase portion be partly opened at the start of filling so as to avoid pressurization of the vessel inside upon filling or vessel fracture resulting from pressurization.

After filling the vessel with the above material in the described manner, the gaseous phase portion alone is preferably purged further with an inert gas in the same manner as described.

For using as a guideline for melting in the step of drawing out, the temperature of the material in the vessel and the pressure of the gaseous phase portion are preferably measured and recorded just after completion of the step of filling.

In the practice of the invention, a radical scavenger is preferably added to the alkoxy(poly)alkylene glycol-containing material for cement additive polymer. This makes it possible to more efficiently prevent the gel-like matter formation resulting from an increase in POV. Such radical scavenger is not particularly restricted but includes, among others, tert-butylhydroxytoluene (2,6-di-tert-butyl-p-cresol; hereinafter also referred to as "BHT" for short), α,α-diphenyl-β-picrylhydrazyl, N,N,N',N'-tetraethyl-p-phenylenediamine, N-(3-N-oxyanilino-1,3-dimethylbutylidine)aniline oxide, p,p'-difluorodiphenylamino, chloranil, iodine, iron (III) chloride, etc. These may be used singly or two or more of them may be used in combination. Among these, tert-butylhydroxytoluene is preferred.

The amount of addition of the above radical scavenger is not particularly restricted in cases it efficiently prevents the increase in POV during storage and/or transfer. Preferably, however, it is, for example, 10 to 1,500 ppm based on the alkoxy(poly)alkylene glycol. If it is less than 10 ppm, the enough effect of the radical scavenger added will not be produced and, if it exceeds 1,500 ppm, the excessive portion added will not produce any extra effect. A level of 100 to 1,200 ppm is more preferred and a level of 200 to 1,000 ppm is still more preferred.

In the above step of storage and/or transfer, without any particular limitation, the vessel is preferably kept tightly closed. In cases where the vessel is stored and/or transferred in an initial tightly closed state, the gaseous phase portion inside can remain sufficiently purged with an inert gas, so that the vessel in that state can be heated to a temperature not lower than the solidifying point in the step of drawing out. On that occasion, it is possible to draw out the contents in a molten state with certainty by heating the vessel until the temperature and pressure measured just after filling are attained even if the state of melting in the vessel cannot be confirmed by visual observation. Furthermore, even when the step of drawing out cannot be carried out for some or other trouble after melting, the gaseous phase remains purged with an inert gas and, therefore, there is no risk of deterioration in quality.

In the above step of drawing out, without any particularly limitation, however, it is preferable to partly open the gaseous phase portion and pass an inert gas therethrough. By doing so, it is possible to avoid contact with air (oxygen) and prevent the vessel from being broken due to an excessive pressure increase or the operation for drawing out from encountering troubles due to depressurization.

Further, in the practice of the invention, during the above step of storage and/or transfer or after the above step of drawing out, the POV of the above material for cement additive polymer is preferably maintained at a level not higher than 2, more preferably not higher than 1, still more preferably not more than 0.7. By this, it becomes possible to prevent the gel-like matter formation with more certainty.

The alkoxy(poly)alkylene glycol-containing material for cement additive polymer as stored and/or transferred according to the present invention can suitably be used as a raw material for producing polymers such as cement additive polymer when the alkoxy(poly)alkylene glycol is converted to a (meth)acrylic ester monomer, for instance. When the alkoxy(poly)alkylene glycol is an unsaturated alcohol-alkylene oxide adduct, this can be used as it is. Suited for use in producing a (meth) acrylic ester monomer from the alkoxy (poly)alkylene glycol is the production process comprising, for example, the step of esterification reaction, if necessary followed by the steps of neutralization, solvent removal by distillation and so forth.

In the above esterification step, a reactant mixture containing an alkoxy(poly)alkylene glycol and (meth)acrylic acid is subjected to esterification reaction, where by the monomer represented by the general formula (1) can be produced in a simple and easy manner from the industrial viewpoint. The compounds as raw materials in such a step may be used by one single species or a combination of two or more species. The alkoxy(poly)alkylene glycol to be used in such a step is preferably free of any unsaturated alcohol-alkylene oxide adduct. The monomer produced in such an esterification reaction step is also referred to as an ester, esterification product or dehydration reaction product.

In the above esterification step, the esterification reaction reaches a state of chemical equilibrium and, therefore, upon removal of the byproduct water produced by the reaction from the reaction vessel, the reaction will further proceed. In such a step, the following procedures, among others, are carried out: (1) the procedure for admixing a dehydrating solvent with the reaction mixture, if necessary, and causing a distillate to be vaporized by azeotropic evaporation of the dehydrating solvent and the byproduct water so that the byproduct water produced in the reaction vessel can be removed with ease, (2) the procedure for said distillate to pass through a connecting pipe connecting the reaction vessel with a condenser and enter the condenser for condensation and liquefaction of the distillate in the condenser, (3) the procedure for separating the condensed and liquefied distillate into the dehydrating solvent and byproduct water in a water separator connected with the condenser and (4) the procedure for refluxing the dehydrating solvent separated into the reaction vessel. In such a step, the above procedures are carried out using, for example, an esterification reaction apparatus comprising, as essential constituents thereof, the reaction vessel, the condenser and the connecting pipe connecting the reaction vessel with the condenser as well as the water separator connected with said condenser by a feeding pipe.

The term "reaction vessel" so referred to herein has the same meaning as the reactor, reaction chamber, reaction kettle, etc. and includes all vessels where an esterification reaction can be carried out, without any particular limitation. The shape of the reaction vessel is not particularly restricted but may be polygonal pillar-like, cylindrical, or the like. In view of the agitating efficiency, handle ability and general purpose, among others, the cylindrical type is preferred, however. It may have or not have a baffule plate. The system of heating the reaction vessel may be one in which heating is carried out by contacting a heating medium, such as steam, with an external jacket or one in which heating is carried out by means of a heating apparatus, such as a coil, equipped in the reaction vessel. The material of construction of the inside of such reaction vessel is not particularly restricted but may be any of such known materials as SUS and the like. Preferred from the viewpoint of corrosion resistance are SUS 304, SUS 316, SUS 316L and the like. More preferred are SUS 316, SUS 316L and the like. The inside wall of the reaction vessel may be processed, for example by glass lining, so that it may be made inert to the reactants and products. Generally, such reaction vessel is equipped with a stirrer so that the esterification reaction can be carried out homogeneously and efficiently. The stirrer is not particularly restricted. The stirrer is generally constituted of an electric motor, a shaft and a stirring blade(s). The stirring blades may be optional in shape and form. As the stirring blades, there may be mentioned desk turbines, fan turbines, curved fan turbines, herringbone turbines, multistage fan turbine blades, Pfaudler type impellers, Brumagin type, angles blades, propeller type, multiple blades, anchor type, gate type, double ribbon blades, screw blades, max blend blades and so forth. Among them, multistage fan turbine blades and Pfaudler-type impellers are preferred in view of general purpose.

The above-mentioned condenser is an apparatus for condensing and liquefying the distillate coming from the reaction vessel, and the condensation/liquefaction is carried out by heat exchange between an extratubular fluid, which is a cooling fluid, and the distillate. The "distillate" means all the matter distilled off from the esterification reaction step and another or other steps. Thus, it includes the byproduct water distilled off from the reaction vessel, the water resulting from the raw material charged in the form of an aqueous solution, the dehydrating solvent used as necessary for azeotropic distillation with the byproduct water and such reactants as (meth)acrylic acid distilled off and so on. It has the form of a gas and/or liquid, for instance.

The material of construction of the condenser may be any of such known ones as SUS, for example SUS 304, SUS 316 and SUS 316L, and carbon steel (CS) species. For further decreasing the gel-like matter formation, the inside wall of condenser may be processesd by mirror finish or glass lining. In view of the cost required for such processing or maintenance, however, the condenser is preferably made of a SUS species such as SUS 304, SUS 316 or SUS 316L, more preferably SUS 316 or SUS 316L.

The heat transfer area of the condenser may vary according to the capacity of the reaction vessel and other factors but is preferably 50 to 500 $m^2$, more preferably 100 to 200 $m^2$, for a reaction vessel of 30 $m^3$, for instance. The cooling medium to be used in such condenser is, for example, water or an oil.

The capacity of the water separator may vary according to the capacity of the reaction vessel, the amount of the distillate and other factors but is preferably 1 to 20 $m^3$, more preferably 3 to 10 $m^3$, for a reaction vessel of 30 $m^3$, for instance.

In the above esterification reaction, a carboxyl-containing unsaturated monomer other than (meth)acrylic acid can also be used. The carboxyl-containing unsaturated monomer is a monomer having at least a carboxyl group and an unsaturated bond and specifically includes, among others, crotonic acid, tiglic acid, citronellic acid, undecylenic acid, elaidic acid, erucic acid, sorbic acid, linolic acid and like unsaturated monocarboxylic acids; maleic acid, fumaric acid, citraconic acid, mesaconic acid, itaconic acid and like unsaturated dicarboxylic acids. These may be used singly or two or more of them may be used in combination.

The above esterification reaction may be carried out, if necessary, in the presence of a catalyst added to the reaction system. Preferably, the reaction is carried out in the presence of a catalyst. An acid catalyst is particularly suited for use in the esterification reaction and can cause the reaction to proceed swiftly. Such an acid catalyst may also be used in the form of a hydrate and/or an aqueous solution and includes, among others, sulfuric acid, methanesulfonic acid, paratoluenesulfonic acid, paratoluenesulfonic acid hydrate, xylenesulfonic acid, xylenesulfonic acid hydrate, naphthalenesulfonic acid, naphthalenesulfonic acid hydrate, trifluoromethanesulfonic acid, "Nafion (trademark)" resin (product of duPont), "Amberlyst 15 (trademark)" resin, phosphotungstic acid, phosphotungstic acid hydrate and hydrochloric acid. These may be used singly or two or more of them may be used in combination.

Preferred among the acid catalysts mentioned above from the viewpoint of the azeotropic point with the dehydrating solvent to be mentioned later herein and water and/or the reaction temperature, for instance, are those having a high boiling point at ordinary pressure (1,013 hPa), specifically a boiling point at ordinary pressure of not lower than 150° C., more preferably not lower than 200° C. As such acid catalysts, there may be mentioned, among others, sulfuric acid (boiling point at ordinary pressure: 317° C.), paratoluenesulfonic acid (boiling point: 185–187° C./13.3 Pa (0.1 mmHg)), paratoluenesulfonic acid hydrate and methanesulfonic acid (boiling point: 167° C./1,333.2 Pa (10 mmHg)). Among them, the use of paratoluenesulfonic acid or paratoluenesulfonic acid hydrate is suitable.

The level of addition of the above acid catalyst is not particularly restricted but may be selected within a range in which the desired catalytic activity can effectively be shown. A level not more than 0.4 milliequivalent/gram, for instance, is preferred. If the addition level exceeds 0.4 milliequivalent/gram, the amount of the diester produced in the reaction system at the esterification reaction increases; thereby, cement additive polymer synthesized from them may show a decreased level of cement dispersing ability. The addition level is more preferably 0.36 to 0.01 milliequivalent/gram, still more preferably 0.32 to 0.05 milliequivalent/gram. The acid catalyst addition level (milliequivalents/g) is expressed by the value obtained by dividing the number of equivalents (milliequivalents) of $H^+$ of the acid catalyst used for the reaction by the total amount (g) of the reactants charged, more specifically the value calculated by the formula given below.

Acid catalyst addition level (milliequivalents/g)=L/(M+N)

L: the number of equivalents (milliequivalents) of $H^+$ of the acid catalyst;

M: the weight (g) of the alcohol charged and;

N: the weight (g) of (meth)acrylic acid charged.

As regards the acid catalyst addition level, it is also preferred, from the viewpoint of the utility of the (meth) acrylic ester monomer to serve as a raw material in the production of polymers to be applied to various uses as chemical products and of the prevention or suppression of the formation of a gel-like matter adversely affecting the dispersivity and other basic performance characteristics required in such applications, that the weight proportion X (% by weight) of the acid in the acid catalyst relative to the total amount of reactants and the weight proportion Y (% by weight) of water occurring as the hydrate moiety in the acid catalyst and/or as an aqueous solution satisfy the relation $0<Y<1.81X-1.62$.

The above relation is explained using a specific example. When paratoluenesulfonic acid monohydrate, for instance, is taken as an example, X (% by weight) is the weight proportion of paratoluenesulfonic acid relative to the total weight of reactants and Y (% by weight) is the weight proportion of the water occurring as the monohydrate relative to the total weight of reactants. It is to be noted that neither the acid component, other than the acid catalyst, for example the reactant (meth) acrylic acid nor such water as the byproduct water produced by the esterification reaction can be taken into consideration for the above X and Y.

When the amount of the acid catalyst added does not satisfy the above relation, for example when Y is 0, there is no water present either in the hydrate form or in the aqueous solution form in the acid catalyst and the amount of the gel formed in the reaction system during the esterification reaction increases; when cement additive polymer is synthesized therefrom, their performance characteristics, for example the cement dispersing ability, may possible be deteriorated. If $Y \geqq 1.81X-1.62$, the amount of the gel formed in the reaction system at the esterification reaction increases, leading to the same results as mentioned above.

The acid catalyst may be added to the reaction system all at once or continuously or in portions. From the workability viewpoint, however, it is preferably charged into the reaction vessel all at once together with the reactants.

The above esterification reaction is preferably carried out in the presence of a polymerization inhibitor. By this, the unsaturated carboxylic acid in the reactant and the product (meth) acrylic ester monomer thereof can be inhibited from being polymerized. Those polymerization inhibitors which are known in the art can be used as such polymerization inhibitor, without any particular limitation. For instance, there may be mentioned phenothiazine, tri(p-nitrophenyl) methyl, di(p-fluorophenyl)amine, diphenylpicrylhydrazyl, N-(3-N-oxyanilino-1,3-dimethylbutylidene)aniline oxide, benzoquinone, hydroquinone, methoquinone, butylcatechol, nitrosobenzene, picric acid, dithiobenzoyl disulfide, cupferron, copper (II) chloride, etc. These may be used singly or two or more of them may be used in combination. Among these, phenothiazine, hydroquinone and methoquinone are preferably used in view of their solubility. These can show their polymerization inhibiting ability very effectively in the esterification reaction step as well as in the step of distilling off the solvent, hence are very useful.

The level of addition of the above polymerization inhibitor is preferably 0.001 to 1% by weight with the total amount of the reactants, namely alcohol and acid, being taken as 100% by weight. If it is less than 0.001% by weight, the polymerization inhibiting effect will be produced only to an unsatisfactory extent, hence it will become impossible to effectively inhibit the reactant and/or product from being polymerized. If it exceeds 1% by weight, the amount of the polymerization inhibitor remaining in the (meth) acrylic ester monomer increases, which may possibly deteriorate the quality and performance characteristics; further, the excessive portion added will not produce any extra effect, which may be disadvantageous from the economical viewpoint. A level of 0.001 to 0.1% by weight is more preferred.

The esterification reaction procedure may be carried out without using any dehydrating solvent but is preferably carried out using a dehydration solvent while, for example, distilling off the byproduct water out of the reaction system azeotropically together with the dehydrating solvent, condensing and liquefying the azeotrope, separating and removing the byproduct water and refluxing the dehydrating solvent. By doing so, the byproduct water produced by the esterification reaction can efficiently be removed azeotropically. Such dehydrating solvent is not particularly restricted but may be any solvent capable of forming an azeotrope with the water. Thus, it includes, among others, benzene, toluene, xylene, cyclohexane, dioxane, pentane, hexane, heptane, chlorobenzene and isopropyl ether. These may be used singly or two or more of them may be used in combination. Among these, those having an azeotropic point with water of not higher than 150° C. are preferred and those having an azeotropic point of 60 to 90° C. are more preferred. As such dehydrating solvents, there may specifically be mentioned cyclohexane, toluene, dioxane, benzene, isopropyl ether, hexane, heptane and the like. When the azeotropic point with water exceeds 150° C., the work ability, inclusive of the controllability of the temperature in the reaction system during reaction and the controllability in the condensation/liquefaction treatment of the distillate, may possibly become poor.

In the esterification reaction procedure using the above dehydrating solvent, the dehydrating solvent is used preferably in an amount of 0 to 100% by weight with the total amount of the reactants, namely alcohol and acid, being taken as 100% by weight. When the amount exceeds 100% by weight, the addition in excess will not produce any extra effect and, in addition, an increased amount of heat is required to maintain the reaction temperature at a constant level, which may possibly be economically disadvantageous. An amount of 2 to 50% by weight is more preferred.

In the above esterification reaction step, the esterification reaction can be carried out by either of the batchwise and continuous reaction procedures. The batchwise procedure is preferred, however. The reaction conditions are not particularly restricted but include preferably those conditions under which the reaction can proceed smoothly. For example, the reaction temperature is preferably 30 to 180° C., more preferably 60 to 130° C., still more preferably 90 to 125° C., most preferably 100 to 120° C. If it is lower than 30° C., the refluxing of the dehydrating solvent will be slow and a longer time will be required to drive the dehydration and, in addition, the reaction may not proceed smoothly to completion. If it is higher than 180° C., the reactants may partly decompose, hence the polymers produced from the (meth) acrylic ester monomer may be deteriorated in dispersing and thickening characteristics in various uses, for example cement dispersing ability, and/or reactant polymerization, increased contamination of the distillate by the reactants and deterioration of the (meth) acrylic ester monomer in performance characteristics and quality may possibly occur.

Under the above reaction conditions, the reaction time is preferably such that the conversion amounts to at least 70%, as mentioned later herein, more preferably at least 80%, still more preferably at least 98%. Normally, it is 1 to 100 hours, preferably 3 to 60 hours. As for the reaction pressure, the reaction may be carried out at ordinary pressure or under reduced pressure. From the equipment viewpoint, the reaction is preferably carried out at ordinary pressure, however. These reaction conditions are esterification reaction conditions given in a general sense for carrying out the esterification reaction step in the practice of the invention. In cases where the dehydrating solvent is distilled off out of the system azeotropically with the byproduct water and the byproduct water is condensed and liquefied and the solvent is refluxed while separating and removing, the reaction conditions are included among those mentioned above but are not quite identical thereto.

Preferably, the above esterification reaction is carried out until a conversion of at least 70% is attained in the esterification reaction. If the conversion is less than 70%, the yield of the product ester will be unsatisfactory and, in addition, the cement additive polymer or the like as obtained by using such product may possibly be deteriorated in performance characteristics required for the intended uses, namely the cement dispersing ability and soon. The conversion is more preferably 70 to 99%, still more preferably 80 to 98%. The above conversion is the percentage derived from the amount of the reactant alcohol as charged and the amount thereof at the time of completion of the reaction and is, for example, the value (%) calculated using the formula given below, following determination of respective peak areas by liquid chromatography (LC) under the conditions shown below:

$$\text{Esterification percentage (conversion \%)}=[(S-T)/S]\times 100$$

S: the area measured for the alcohol charged;

T: the area measured for the alcohol after completion of the esterification.

Conversion Measuring Conditions

Analyzing apparatus: Waters Millennium Chromatography Manager (trademark)

Detector: Waters 410 RI detector (trademark)

Columns to be used: GL Science Inertsil ODS-2 (inside diameter 4.6 mm, length 250 mm) (trademark), three columns Column temperature: 40° C.

Eluent: A solution prepared by mixing 8,946 g of water, 6,000 g of acetonitrile and 54 g of acetic acid together and adjusting the pH to 4.0 with a 30% aqueous solution of sodium hydroxide.

Flow rate: 0.6 ml/min.

When an acid catalyst is used in the above esterification reaction step, it is preferable to carry out a neutralization step for neutralizing the acid catalyst and (meth) acrylic acid. The catalyst thereby loses its activity and the (meth) acrylic ester monomer obtained by the esterification reaction can be prevented from being hydrolyzed and the formation of impurities not involved in polymerization can be suppressed and, as a result, the polymers can be prevented from being deteriorated in quality and performance characteristics. When a dehydrating solvent is used, it is preferable to carry out a solvent distilling step comprising distilling off the dehydrating solvent for removing said dehydrating solvent.

The above neutralization step is preferably carried out, for example, by neutralizing the acid catalyst with a neutralizing agent after completion of the esterification reaction.

The above neutralizing agent is not particularly restricted as far as the agent is able to neutralize the acid catalyst. Thus, there may be mentioned, among others, alkali metal or alkaline earth metal hydroxides such as sodium hydroxide, potassium hydroxide, calcium hydroxide and lithium hydroxide; alkali metal or alkaline earth metal carbonates such as sodium carbonate, calcium carbonate and lithium carbonate; ammonia and amines such as monoethanolamine, diethanolamine and triethanolamine. These may be used singly or in combination of two or more thereof. Although the form of the neutralizing agent is not particularly restricted, the form of an alkaline aqueous solution is preferred.

In the above neutralization step, the acid catalyst and (meth) acrylic acid are neutralized and it is preferred that the amount of the neutralizing agent be selected so that the whole amount of the acid catalyst and a part of (meth)acrylic acid can be neutralized. In this case, the portion of (meth) acrylic acid to be neutralized is not more than 20% by weight, more preferably 0.01 to 5% by weight with the amount of (meth) acrylic acid remaining after the esterification reaction being taken as 100% by weight. Among the acid catalyst and (meth) acrylic acid, the acid catalyst is higher in acid strength, hence the acid catalyst is first neutralized.

As regards the method of neutralization in the above neutralization step, when the esterification reaction is carried out in a dehydrating solvent, it is preferable to add a large amount of water to the reaction system together with the alkali. This is because, in the absence of a large amount of water, the alkali, which is hardly soluble in the dehydrating solvent, floats in a highly concentrated state in the reaction system and such floating of the high concentration alkali continues for a long period until the alkali has been consumed for neutralization, thus causing hydrolysis of (meth) acrylic ester monomer. In this case, the amount of water to be added may vary according to the application form of the alkali but, when a 40 to 60% (by weight) aqueous solution of an alkali is used as the neutralizing agent, water is preferably added, in addition to the aqueous alkali solution, generally in an amount of 5 to 1,000 parts by weight, more preferably 10 to 100 parts by weight, per part by weight of the aqueous alkali solution. If the amount of water is less than 5 parts by weight, the alkali may occur in an unhomogeneous state. If it is exceeds 1,000 parts by weight, a separate neutralization vessel may be required to secure the productivity, for instance, leading to an increase in production cost.

The neutralization temperature in the above neutralization step is preferably not higher than 90° C., for instance, more preferably 0 to 80° C., still more preferably 25 to 65° C. At temperatures higher than 90° C., the neutralizing agent added may act as a hydrolyzing catalyst, possibly causing hydrolyzate formation in large amounts. At 80° C. or below, such hydrolyzates formation is sufficiently inhibited whereas, at below 0° C., the reaction mixture becomes viscous and the stirring becomes difficult accordingly and, in addition, a long period of time is required for lowering the temperature to a predetermined level following the removal of water by distillation after the reaction and/or it becomes necessary to provide a new cooling means (apparatus) for lowering the temperature to a level lower than room temperature, whereby the cost of production may possibly be increased.

The method of distilling off the dehydrating solvent in the above-mentioned solvent distilling step is not particularly restricted. For example, the dehydrating solvent alone may be distilled off, or the solvent may be distilled off with an appropriate additive added. It is preferable, however, to use water and distill off the dehydrating solvent azeotropically. In this case, no substantial amount of the acid catalyst or alkali remains in the reaction system owing to the neutralization step carried out, so that even when water is added and the temperature is raised, no hydrolysis reaction takes place. By using such a method, the dehydrating solvent can be removed at lower temperatures.

The conditions for the above method of distilling off are not particularly restricted provided that the dehydrating solvent in the reaction system can appropriately be distilled off (evaporated). Generally, when water is used, the liquid temperature (at ordinary pressure) in the reaction vessel during distilling off the solvent, for instance, is preferably 80 to 120° C., more preferably 90 to 110° C. When water is not used, a temperature of 80 to 160° C. is generally preferred and a temperature of 90 to 150° C. is more preferred. In either of the above cases, a lower temperature than the above-specified range may fail to be a sufficient temperature (provide a sufficient quantity of heat) to evaporate the dehydrating solvent while, at a higher temperature than the above range, polymerization may be caused and a large quantity of heat may be consumed in evaporating a large amount of low-boiling reactants. As for the pressure within the reaction vessel, the distillation may be carried out at ordinary pressure or under reduced pressure. From the equipment viewpoint, however, it is preferably carried out at ordinary pressure.

The apparatus system used in the esterification reaction step is preferably used as such as the apparatus system in the above step of distilling off the solvent.

The alkoxy(poly)alkylene glycol-containing material for cement additive polymer according to the present invention, namely the material for cement additive polymer as stored and/or transferred in accordance with the present invention, can suitably be applied as a raw material for the production of various polymers. Such polymers can suitably be used as raw materials in preparing cement additives, for instance, and, in addition, they can also be used as such chemical products as pigment dispersants for dispersing calcium carbonate, carbon black, ink and the like, scaling inhibitors, dispersants for gypsum-water slurries, dispersants for coal-water slurries (CWMs) and thickening agents.

In the following, a method of producing a cement additive polymer from the alkoxy(poly)alkylene glycol-containing material for cement additive polymer as stored and/or transferred in accordance with the present invention, a method of producing cement additives containing the cement additive polymer and a method of using the cement additives are described.

As the cement additive polymer, there may be mentioned poly carboxylic acid type polymers obtainable by polymerizing a monomer comprising the (meth)acrylic ester monomer or unsaturated alcohol-alkylene oxide adduct and an unsaturated carboxylic acid monomer as essential components. The polymerization method for producing such polycarboxylic acid type polymer is not particularly restricted but includes known methods in the art such as solution polymerization or bulk polymerization, for instance, using a polymerization initiator may be employed.

The above unsaturated carboxylic acid monomer includes, among others, (meth) acrylic acid, crotonic acid, tiglic acid, citronellic acid, undecylenic acid, elaidic acid, erucic acid, sorbic acid, linolic acid and like unsaturated monocarboxylic acids; maleic acid, fumaric acid, citraconic acid, mesaconic acid, itaconic acid and like unsaturated dicarboxylic acids; and monoesters derived from these dicarboxylic acids and alcohols; as well as univalent metal salts, bivalent metal salts, ammonium salts and organic amine salts thereof.

The polycarboxylic acid type polymers may also be coporimerized with a monomer other than the unsaturated carboxylic acid monomers, if necessary. As such monomers, there may be mentioned (meth) acrylic acid, unsaturated amides such as (meth) acrylalkylamides; vinyl esters such as vinyl acetate and vinyl propionate; unsaturated sulfonic acids such as vinylsulfonic acid, (meth)allylsulfonic acid, sulfoethyl (meth) acrylate, 2-methylpropane sulfonic acid (meth) acrylamide and styrenesulfonic acid, and univalent metal salts, bivalent metal salts, ammonium salts and organic amine salts thereof; aromatic vinyls such as styrene and α-methylstyrene; esters of (meth) acrylic acid with an aliphatic alcohol containing 1 to 18 carbon atoms, preferably 1 to 15 carbon atoms or a phenyl group-containing alcohol such as benzyl alcohol; polyalkylene glycol mono(meth) acrylates; polyalkylene glycol mono(meth)allyl ethers; and so forth.

The above polycarboxylic acid type polymers are preferably polymers having a weight average molecular weight within a specific range. For example, the weight average molecular weight on the polyethylene glycol equivalent basis as determined by gel permeation chromatography (hereinafter, "GPC") under the measuring conditions given below is preferably 500 to 500,000. If it is less than 500, the water reducing capacity of the resulting cement additives may decrease. If it exceeds 500,000, the water reducing and slump loss reducing effects of the cement additives may decrease. A range of 5,000 to 300,000 is more preferred and a range of 8,000 to 100,000 is most preferred.

The apparatus for carrying out the above GPC is constituted of an eluent storage tank, eluent feeding mechanism, automated sampler, column oven, column, detector, data processing machine and so forth. The molecular weight in question can be determined, for example by combinedly using the following commercial devices and selecting the measuring conditions given below:

Molecular Weight Measuring Conditions

Model: LC Module 1 plus (trademark; product of Waters)

Detector: Differential refractometer (RI) 410 (trademark; product of Waters)

Eluent: A solution prepared by mixing 0.05 M sodium acetate and acetonitrile-deionized water (40/60) and adjusting the pH to 6.0 with acetic acid.

Eluent flow rate: 1.0 ml/min.

Columns:

TSK-GEL guard column (inside diameter 6 mm, length 40 mm) +TSK-GEL G-4000 SWXL (inside diameter 7.8 mm, length 300 mm)+TSK-GEL G-3000 SWXL (inside diameter 7.8 mm, length 300 mm)+TSK-GEL G-2000 SWXL (inside diameter 7.8 mm, length 300 mm) (all being trademarks; products of Tosoh Corp.)

Column oven temperature: 40° C.

Working curve: The working curve varies according to the molecular weights and the number of standard samples and the molecular weights thereof, the method of drawing baseline and the method of obtaining an approximate expression for the working curve, among others. Therefore, the following conditions are preferably established.

1. Reference Samples

Commercially available standard polyethylene oxide (PEO) species and standard polyethylene glycol (PEG) species are used as the standard samples. Preferably, those having the following molecular weights are used as the standard samples: 1470, 4250, 7100, 12600, 24000, 46000, 85000, 219300, 272500 (9 points in total).

In selecting these standard samples, the following were taken into consideration:

(1) At least 7 standard samples having a molecular weight not less than 90 were included;

(2) At least one standard sample having a molecular weight between 900 and 2,000 were included;

(3) At least 3 standard samples having a molecular weight between 2,000 and 60,000 were included;

(4) At least one standard sample having a molecular weight of 200,000±30,000 were included;

(5) At least one standard sample having a molecular weight of 270,000±30,000 were included.

2. Method of Drawing Baseline

Upper limit to molecular weight: A point where a peak appears from a horizontal and stable baseline.

Lower limit to molecular weight: A point where the main peak detection is finished.

3. Approximate Expression of the Working Curve

Based on the working curve ("elution time" versus "logarithm of molecular weight") constructed by using the above standard samples, a cubic approximate expression is derived and this is used in calculations.

The cement additive polymer comprising the above-mentioned polycarboxylic acid type polymer can show good cement dispersing and slump maintaining capacities. If necessary, however, any of known cement additives (cement dispersants) other than the above polycarboxylic acid type polymer may further be mixed therein.

In the above cement additive polymer compositions, there may also be mixed air entraining agents, cement wetting agents, expanding agents, waterproof agents, retarders, set accelerating agents, water-soluble high-molecular substances, thickening agents, flocculants, drying shrinkage lowering agents, reinforcing agents, accelerators, antifoaming agents and so forth.

The thus-obtained cement additives are used in cement compositions comprising cement and water, for example in hydraulic cement compositions comprising portland cement, high belite content cement, alumina cement or any of various cement blends, and in gypsum and other hydraulic materials than cement compositions.

The above cement additives produce excellent effects on hydraulic material even at lower addition levels as compared with the conventional cement additives. In adding to mortar or concrete in which hydraulic cement is used, for instance, they may be added, in the step of blending, in an amount of 0.001 to 5% by weight with the amount of cement, being taken as 100% by weight. At a level lower than 0.001% by weight, the cement additive effects may not be satisfactorily produced. If the level exceeds 5% by weight, no more substantial increase in effect will be obtained, which may be economically disadvantageous. A level of 0.01 to 1% by weight is more preferred. Thereby, various effects can be produced, for example attainment of high water reducing ratios, improvements in slump loss inhibiting ability, reductions in water content per unit volume, increases in strength and improvements in resistance.

An embodiment of the present invention, namely the method of storing and/or transferring the alkoxy(poly)alkylene glycol-containing material for cement additive polymer, which method comprises a step of filling a vessel, a step of storage and/or transfer and a step of drawing out is described taking, as an example, the case where a material for cement additive polymer production which is a solid at ordinary temperature is used and a container is used as the vessel. Such embodiment is typical of the mode of embodiment of the present invention but is not limitative thereof.

The above container is equipped, for example, with a vent valve for introducing air or an inert gas into the container and a liquid inlet for introducing the material for cement additive polymer into the container at the upper part thereof and with a discharge valve for discharging the container contents at the lower part thereof and further with a jacket having an inlet and outlet for steam for warming the container contents. Such a container generally has a capacity of 1 to 30 $m^3$. For example, there may be mentioned an ISO container having a capacity of 17 to 24 $m^3$.

In the above-mentioned step of filling a vessel, a procedure is preferably carried out which comprises (1) purged the vessel inside air with nitrogen gas, (2) filling the vessel with the material for cement additive polymer, (3) purged the gaseous phase portion within the vessel with nitrogen gas, (4) tightly closing the vessel and (5) pressurizing the vessel inside with nitrogen gas.

The above operation (1) or (3) is carried out, for example, by connecting a pipe (nitrogen gas line) for nitrogen gas feeding with the vent valve of the container and feeding nitrogen gas into the container inside. Either of the container or nitrogen gas line is equipped with a pressure gauge for detecting the container inside pressure and a purge valve for adjusting the pressure. After raising the internal pressure to 0.03 to 0.2 Pa by feeding nitrogen gas into the container inside, the purge valve is gradually opened to lower the internal pressure to 0.01 to 0.02 Pa. This procedure is preferably repeated at least 4 times. This makes it possible to reduce the oxygen concentration in the gaseous phase portion within the container to a level not higher than 1,000 ppm and produces the effects of the invention with more certainty.

The above operation (2) is carried out, for example, by connecting a pipe (filling line) for filling the container with the material for cement additive polymer through the liquid inlet thereof and, simultaneously with the start of filling, the purge valve is gradually opened to thereby adjust the internal pressure. After completion of the filling of the material for cement additive polymer, all the valves are closed and the filling line is disconnected from the container.

The above operation (5) is carried out, for example, by opening the vent valve of the container and feeding nitrogen gas into the container to thereby raise the internal pressure to 0.05 to 0.5 Pa, followed closing the vent valve and then opening the purge valve to adjust the internal pressure. After completion of these operations, the nitrogen gas line is disconnected from the container. Thereafter, the container, in a tightly closed state, is subjected to the step of storage and/or transfer, and the material for cement additive polymer is maintained at a temperature not higher than the solidifying point thereof, if necessary by cooling, but without warming or heat insulating the container, so that the gel-like matter formation and the occurrence of decomposition reactions can be satisfactorily inhibited.

In the above-mentioned step of drawing out, a procedure is preferred which comprises (1) raising the temperature of the container inside with the container remaining in a tightly closed state, (2) raising the temperature of the liquid discharge valve of the container and (3) drawing out the material for cement additive polymer after complete melting thereof.

The above operation (1) is carried out, for example, by connecting a pipe (steam line) for supplying steam to the steam inlet of the container, connecting a pipe for discharging steam, if necessary, to the steam outlet, and raising the container inside temperature by passing steam through the steam line. On that occasion, the container inside temperature is preferably controlled so that it may not become higher by 150° C., more preferably not higher by 70° C., than the solidifying point of the material for cement additive polymer. On that occasion, by heating to an extent such that the pressure of the gaseous phase portion becomes higher than the pressure at the time of tight closure of the vessel in the step of filling, it becomes possible to melt the material for cement additive polymer with more certainty. This method is particularly effective in cases where it is difficult to confirm as to whether any solid portion of the material for cement additive is remaining in the container.

The above operation (2) is carried out, for example, by blowing steam against the surroundings of the liquid discharge valve or winding a readily formable steam line made of copper and the like around the same, covering the line with a heat insulator and raising the temperature with steam.

The above operation (3) is carried out, for example, by gradually opening the purge valve, after a complete temperature rise in the container inside, to reduce the gauge pressure to 0 Pa and then confirming whether a solid portion of the material for cement additive polymer is remaining or not while passing nitrogen gas. If a solid portion is found remaining, nitrogen gas is fed into the container inside in the same manner as described above and then the above operation (1) is carried out and such procedure is repeated until no more solid portion is found remaining. Thereafter, while nitrogen gas is passed through the gaseous phase portion of the container, a pipe (transfer line) for transferring the material for cement additive polymer to a raw material tank is connected with the liquid discharge valve and the liquid discharge valve is then opened, whereby the material for cement additive polymer is transferred to the raw material tank. On that occasion, the transfer is preferably carried out by providing the transfer line with a pump for filling, and the transfer line and/or the pump is preferably protected by winding a steam line around the same. After confirming that no portion of the material for cement additive polymer is remaining in the container, the steam line and transfer line are disconnected from the container, whereupon the step of drawing out is finished.

The storing and/or transferring method of an alkoxy(poly) alkylene glycol-containing material for cement additive polymer according to the present invention, which has the constitution mentioned above, can satisfactorily prevent the occurrence of gel-like matter formation and decomposition reactions and thereby can satisfactorily prevent the occurrence of troubles in the production process and the deteriorations in performance characteristics and quality of cement additives as well as various chemical products such as pigment dispersants for calcium carbonate, carbon black and ink, scaling inhibitors, dispersants for gypsum-water slurries, dispersants for coal-water slurries (CWMs) and thickening agents.

EXAMPLES

The following examples illustrate the present invention in further detail. These examples are, however, by no means limitative of the scope of the present invention. Unless otherwise specified, "part(s)" means "part(s) by weight" and "%" means "% by weight".

Production Example 1

An autoclave equipped with a thermometer, pressure gauge and stirrer was charged with 4 parts of flaky sodium hydroxide and sufficient nitrogen substitution was performed by repeating the procedure comprising pressurization with nitrogen and discharging. Then, 575 parts of methanol was charged, and the temperature of the mixture was raised to 90° C. The initial pressure was set at 0.15 MPa, and 7,900 parts of ethylene oxide was added over 8 hours, during which the reaction temperature was maintained at 125±5° C. and the reaction pressure at 0.78 MPa or below. Further, the reaction temperature was maintained for 2 hours to drive the addition reaction of ethylene oxide with methanol to completion, where by methoxypoly (n=10) ethylene glycol [$CH_3O(CH_2CH_2O)_{10}H$] resulting from adding 10 moles of ethylene oxide to each mole of methanol was obtained. The thus-obtained alkoxypolyalkylene glycol (1) was measured, just after the addition reaction, for peroxide value by the method described below. The peroxide value was 0.0 milliequivalent/g. The alkoxypolyalkylene glycol (1) had a solidifying point of 10° C.

Method of Peroxide Value Determination

A 10-g portion of the alkoxypolyalkylene glycol was accurately measured in an Erlenmeyer flask equipped with a stopcock, and 50 ml of a solvent (mixture of 500 ml of isopropyl alcohol, 100 ml of water and 150 ml of acetic acid) was added to dissolve the sample. After dissolution of the sample, while the flask inside was purged with nitrogen gas, 1 ml of saturated potassium iodide was added and the mixture was stirred for 1 minute and then allowed to stand in the dark for 30 minutes, whereby a yellow transparent test solution was prepared. Then, this test solution was titrated with 0.01 N sodium thiosulfate until the brown color of the test solution disappeared. The amount (ml) of the titrant sodium thiosulfate was determined and the peroxide value was calculated according to the formula given below. A blank value (ml) was obtained by following the same procedure as mentioned above except that a test solution prepared without adding the alkoxypolyalkylene glycol was used instead of the above test solution.

Peroxide value (milliequivalents/g)=$(S-B)\times 10/I$

S: Amount (ml) of the titrant sodium thiosulfate when the sample was charged;

B: Blank value (ml);

I: Amount (g) of the sample charged.

Production Example 2

An autoclave equipped with a thermometer, pressure gauge and stirrer was charged with 751 parts of the alkoxypolyalkylene glycol (1) and sufficient nitrogen substitution was performed by repeating the procedure comprising pressurization with nitrogen and discharging. The temperature was set to 153° C., the pressure was set at 0.15 MPa, and 1,050 parts of ethylene oxide was added over 6 hours, during which the reaction temperature was maintained at 153±5° C. and the reaction pressure at 0.78 MPa or below. The reaction temperature was further maintained for 1 hour to drive the addition reaction of ethylene oxide onto methanol to completion, whereby methoxypoly(n=25)ethylene glycol [$CH_3O(CH_2CH_2O)_{25}H$] resulting from adding 25 moles of ethylene oxide to each mole of methanol was obtained. The thus-obtained alkoxypolyalkylene glycol (2) had a peroxide value of 0.0 milliequivalent/g as measured just after the addition reaction. The alkoxypolyalkylene glycol (2) had a solidifying point of 40° C.

Production Example 3

An autoclave equipped with a thermometer, pressure gauge and stirrer was charged with 1,800 parts of the alkoxypolyalkylene glycol (2) and 7.7 parts of a 50% aqueous solution of sodium hydroxide and, after dehydration by depressurization and heating, nitrogen substitution was performed by pressurizing with nitrogen. The temperature was set to 153° C., the pressure was set at 0.15 MPa, and 6,647 parts of ethylene oxide was added over 5 hours, during which the reaction temperature was maintained at 153±5° C. and there action pressure at 0.78 MPa or below. The reaction temperature was further maintained for 1 hour to drive the addition reaction of ethylene oxide onto methanol to completion, whereby methoxypoly(n=120)ethylene glycol [$CH_3O(CH_2CH_2O)_{120}H$] resulting from adding 120 moles of ethylene oxide to each mole of methanol was obtained. The thus-obtained alkoxypolyalkylene glycol (3) had a peroxide value of 0.1 milliequivalent/g as measured just after the addition reaction. The alkoxypolyalkylene glycol (3) had a solidifying point of 55° C.

Production Example 4

An autoclave equipped with a thermometer, pressure gauge and stirrer was charged with, 1870 parts of 3-methyl-3-buten-1-ol and 6 parts of flaky sodium hydroxide, and sufficient nitrogen substitution was performed by repeating the procedure comprising pressurization with nitrogen and discharging the same. The temperature of the mixture in the autoclave was raised to 120° C., the initial pressure was set at 0.09 MPa, and 9,560 parts of ethylene oxide was added over 15 hours, during which the reaction temperature was maintained at 120±5° C. and the reaction pressure at 0.78 Mpa or below. The reaction temperature was further maintained for 1 hour to thereby drive the addition reaction of ethylene oxide to the alcohol to completion, whereby a 3-methyl-3-buten-1-ol poly(n=10)ethylene glycol adduct [$CH_2{=}C(CH_3)CH_2CH_2O(CH_2CH_2O)_{10}H$] resulting from adding 10 moles of ethylene oxide to each mole of 3-methyl- 3-buten-1-ol was obtained. The thus-obtained alkoxypolyalkylene glycol (4) had a solidifying point of 17° C.

Production Example 5

An autoclave equipped with a thermometer, pressure gauge and stirrer was charged with 1,145 parts of the alkoxypolyalkylene glycol (4) and 4 parts of a 50% aqueous solution of sodium hydroxide and, after dehydration by depressurization and heating, nitrogen substitution was performed by pressurizing with nitrogen. The temperature was set to 120° C., the pressure was set at 0.16 MPa, and 3,825 parts of ethylene oxide was added over 12 hours, during which the reaction temperature was maintained at 120±5° C. and the reaction pressure at 0.78 MPa or below. The reaction temperature was further maintained for 1 hour, whereby a 3-methyl-3-buten-1-ol poly(n=50)ethylene glycol adduct $[CH_2{=}C(CH_3)CH_2CH_2O(CH_2CH_2O)_{50}H]$ resulting from adding 50 moles of ethylene oxide to each mole of 3-methyl-3-buten-1-ol was obtained. The thus-obtained alkoxypolyalkylene glycol (5) had a solidifying point of 52° C. and had a hydroxyl value of 25.1 mg KOH/g, a PEG content of 6.1% and an isoprene content of 960 ppm, as measured respectively by the methods described below.

Method of Hydroxyl Value Determination (1) Phthalic anhydride (35 g) was dissolved in 200 ml of pyridine (special reagent grade) and the thus-prepared phthalating reagent was stored in a light resistant bottle. (2) About 2.4 g of the sample was placed in a Teflon-stoppered flask and accurately measured to a precision of 0.1 mg. (3) The phthalating reagent (9 ml) was added using a dispenser. The phthalating reagent in the dispenser was sufficiently purged prior to use so that the measurement error could be reduced. (4) In a blank procedure, three flasks containing no sample were prepared and 9 ml of the phthalating reagent was added to each flask using the dispenser. (5) The sample-containing flask was stoppered and heated on a hot plate (trademark: “HGT-180”; product of Toshiba) adjusted to a surface temperature of 120±5° C. to allow the esterification reaction to proceed. The reaction time was 30 minutes. The blank flasks were not heated. (6) During heating, the reaction mixture was stirred once or twice while taking care not to scatter the same. (7) After cooling to room temperature, about 50 ml of pure water was added. (8) The flask was equipped with an automatic titrator (trademark: “COMTITE 500”; product of Hiranuma Sangyo) and titration was carried out with 0.5 N potassium hydroxide. The 0.5 N potassium hydroxide in the buret was sufficiently purged prior to use to remove bubbles. (9) Two or three measurements were carried out for each sample and the mean value was calculated. (10) In case the sample was alkaline or acidic, the hydroxyl value of the sample was determined by correcting the hydroxyl value obtained according to the formula given below. (11) Where necessary, the average molecular weight and the number of moles of ethylene oxide added were calculated based on the hydroxyl value obtained.

Hydroxyl value=$(B-A)\times 0.5\times 56.11/G-AC+AG$

B: Amount (ml) of the titrant in the blank test;

A: Amount (ml) of the titrant for the sample;

F: 0.5 N, concentration of the potassium hydroxide solution:

G: Weight (g) of the sample taken;

AC: Alkali value (mg KOH/g) of the sample;

AV: Acid value (mg KOH/g) of the sample.

The PEG content was determined by high performance liquid chromatography under the following conditions:

PEG Content Measuring Conditions

Liquid feeder: Hitachi model L-6000 (trademark);

Automatic sampler: Hitachi model L-7200 (trademark);

Analyzer: Shimadzu model LC-10 (trademark);

RI detector: GL Science model 504R (trademark);

Column used: Shodex model Asahipak GF-310 (trademark) (300 mm in length), one column;

Column temperature: 40° C.;

Eluent: pure water;

Flow rate: 1.5 ml/min;

Injection size: 20 μl.

The isoprene content was determined by gas chromatography-mass spectrometry (GC-MS) under the following conditions.

Isoprene Content Measuring Conditions

GC-MS: Shimadzu model GC-17A and QP-5000 (trademarks);

Head space: Perkin-Elmer model HS-40 (trademark);

Column: J&W model DB-1 (trademark) (0.32 mm in inside diameter×60 m in length×1 μl in membrane thickness);

Mobile phase: helium gas;

Flow rate: 130 kPa (head space inlet regulator);

Column temperature programming: 5° C./min from 80 to 250° C., followed by maintaining at 25° C. for 10 minutes;

Injection temperature: 250° C.;

HS sample heating conditions: 130° C.×10 minutes;

HS needle temperature: 170° C.;

HS trans temperature: 170° C.;

GC-MS interface temperature: 250° C.

Example 1

[Transfer]

Filling a Vessel Step

A nitrogen line equipped with a purge valve was connected with the vent valve of a stainless steel (SUS 316L) container (ISO container, capacity: 24,000 L) equipped with a pressure gauge, thermometer, warming means, manhole, vent valve, safety valve, upper liquid inlet and lower liquid outlet, among others. The container inside was pressurized to 0.30 MPa, the purge valve was then opened to reduce the container inside pressure to 0.002 MPa and the purge valve was closed. The container was again pressurized with nitrogen to 0.30 MPa and then depressurized. This procedure was repeated 5 times, whereby the oxygen concentration within the ISO container was reduced to 0.08%.

Then, the container was filled with 19,500 kg of the alkoxypolyalkylene glycol (2) obtained in Production Example 2 and occurring as a liquid at 55° C. from the upper liquid inlet by means of the pump while taking care to prevent air from entering the container. Simultaneously with the start of filling, the purge valve was opened so that the container inside might not be pressurized. Simultaneously with the completion of filling, the purge valve was closed so that air might not enter the container. Then, the container inside was pressurized with nitrogen to 0.1 MPa (gauge pressure) and the container was tightly closed. The thermometer fitted to the container showed a temperature of 54° C.

Transfer Step

The above container, in a tightly closed state, was transferred by sea over 1.5 months. At the time of arrival at the destination, the thermometer showed a temperature of 22° C.

and the pressure gauge a pressure of 0.07 MPa. It was thus considered that contents were in a solidified state.

Drawing Out Step

The container as tightly closed was heated by passing steam at 0.2 MP a through the jacket type warming means (heating surface: 7.5 $m^2$). After 22 hours from the start of heating, the thermometer of the container showed a temperature of 63° C. but the pressure gauge showed a pressure of 0.089 MPa, so that the steam feeding was controlled so that the temperature might be maintained at 60±10° C. After 37 hours from the start of heating, the container thermometer showed a temperature of 68° C. and the pressure gauge a pressure of 0.11 MPa.

A flexible line for transfer was connected with the lower discharge valve and the surroundings of the discharge valve was heated by blowing steam against the same. Then, a nitrogen line equipped with a purge valve was connected with the vent valve of the container, and the purge valve was opened to thereby make the container inside pressure equal to atmospheric pressure. The manhole was opened and it was confirmed that the alkoxypolyalkylene glycol in the container had been completely melted. Simultaneously with the opening of the manhole, care was taken to prevent the entrance of air through the manhole by passing nitrogen through the nitrogen line. While passing nitrogen into the gaseous phase portion in the container, transfer was started through the lower discharge valve to a storage tank by means of a pump. In an hour from the start of transfer through the pump, the transfer of the whole amount to the storage tank was complete. The one month and half transfer (mainly by sea) was finished.

The gaseous phase portion in the storage tank was purged with nitrogen and the material was stored with temperature control at 60±10° C. The material in the storage tank was used before long. At the time of use, the peroxide value of the alkoxypolyalkylene glycol (2A1) was 0.25 milliequivalent/g.

Esterification

A glass-made reaction vessel equipped with a thermometer, stirrer, byproduct water separator and reflux condenser was charged with 16,500 parts of the alkoxypolyalkylene glycol (2A1), 4,870 parts of methacrylic acid, 1,070 parts of cyclohexane as dehydrating solvent, 667 parts of a 70% aqueous solution of paratoluenesulfonic acid as acid catalyst and 5 parts of phenothiazine as polymerization inhibitor and the esterification reaction was started by raising the temperature to 107° C. while stirring the mixture solution. After 20 hours, the esterification degree was confirmed to have reached at least 99%, the mixture was cooled to 60° C. or below, and 2,600 parts of a 4.2% aqueous solution of sodium hydroxide and 2,490 parts of water were added. Then, the temperature was again raised and the cyclohexane was distilled off azeotropically with water to give an 80% aqueous monomer mixture solution (MA1). During the above esterification reaction, no gel-like matter formed.

Polymerization

Then, a glass-made reaction vessel equipped with a thermometer, stirrer, dropping funnel, nitrogen inlet tube and reflux condenser was charged with 8,220 parts of water and the reaction vessel inside was purged with nitrogen with stirring and the temperature of water was raised to 80° C. in a nitrogen atmosphere. Further, a mixed solution of 13,250 parts of the 80% aqueous monomer mixture solution (MA1) obtained in the above manner and 100 parts of mercapto propionic acid was added dropwise to the reaction vessel over 4 hours. Simultaneously with the start of this dropping, an aqueous solution of 125 parts of ammonium persulfate as polymerization initiator in 1,000 parts of water was added dropwise over 5 hours. After completion of the dropwise addition of the polymerization initiator, the reaction temperature was further maintained at 80° C. for 1 hour to drive the polymerization reaction to completion. The reaction mixture was neutralized to pH 7 with a 50% aqueous solution of sodium hydroxide to give an aqueous solution (A1) of a polymer having a weight average molecular weight (measured by gel permeation chromatography (GPC) and expressed on the polyethylene glycol equivalent basis; herein after the same shall apply) of 20,000.

The aqueous polymer solution (A1) gave a GPC chart showing no high molecular peak. A portion of the aqueous polymer solution (A1) was placed in a transparent glass bottle (200 ml) and observed by the eye; no gel-like matter was confirmed. In addition, no gel-like matter accumulation was observed in the strainer of the transfer pump.

Comparative Example 1

[Transfer]

Filling a Vessel Step

In a laboratory, a 2.4-liter vessel (SUS 316L) equipped with a pressure gauge and a valve was purged with nitrogen in the same manner as described in Example 1 and filled with 1.95 kg of the alkoxypolyalkylene glycol (2) obtained in Production Example 2. The vessel was pressurized to 0.1 MPa with nitrogen and then tightly closed.

Transfer Step

On the supposition that the same ISO container as Example 1 was to be transferred over 1.5 months at 60° C. in heat insulation, the above vessel was stored at a temperature (60° C.) above the solidifying point for 1.5 months to give an alkoxypolyalkylene glycol (2C1).

Drawing Out Step

The alkoxypolyalkylene glycol (2C1) had a peroxide value (POV) of 1.3 milliequivalents/g. The cost of transportation for the case of continued temperature maintenance at 60° C. during transportation on a ship was estimated and found to become higher by about 50%. No actual transportation on the ISO container scale was carried out accordingly.

Esterification

The alkoxypolyalkylene glycol (2C1) having a peroxide value of 1.3 milliequivalents/g was subjected to esterification in the same manner as described in Example 1 to give an 80% aqueous monomer mixture solution (MC1). During esterification, a gel-like matter formed. When a portion of the 80% aqueous monomer mixture solution (MC1) was placed in a transparent glass bottle (200 ml) and observed by the eye, a gel-like floating matter was confirmed. Upon examination of a GPC chart, a small peak indicative of the presence of a high molecular fraction was also confirmed.

Example 2

Storage

A plastic vessel was filled with 1.5 kg of the alkoxypolyalkylene glycol (2) obtained in Production Example 2 and occurring as a liquid at 70° C. in an atmosphere of air. After filling, the vessel was tightly closed and allowed to stand at room temperature. After 5 hours, the contents were found to have solidified. One week later, the plastic vessel was placed in a drier maintained at 90° C. and the contents were melted over 12 hours with occasional shaking. The alkoxypolyalkylene glycol (2A2) thus melted had a peroxide value of 0.20 milliequivalent/g.

Esterification

A glass-made reaction vessel equipped with a thermometer, stirrer, byproduct water separator and reflux condenser was charged with 1,484 g of the alkoxypolyalkylene glycol (2A2), 121 g of methacrylic acid, 80.2 kg of cyclohexane as dehydrating solvent, 51 g of a 70% aqueous solution of paratoluenesulfonic acid as acid catalyst and 0.40 g of phenothiazine as polymerization inhibitor and the esterification reaction was carried out while controlling the temperature at 115 to 125° C. and stirring the mixture solution. After 40 hours, the esterification degree was confirmed to have reached at least 99%, and 189 g of a 4.2% aqueous solution of sodium hydroxide and 178 g of water were added. Then, the temperature was again raised and the cyclohexane was distilled off azeotropically with water. After minor adjustment of the component, an 80% aqueous monomer mixture solution (MA2) was obtained. During the above esterification reaction, no gel-like matter formed.

Comparative Example 2

Storage

A plastic vessel was filled with 1.5 kg of the alkoxypolyalkylene glycol (2) obtained in Production Example 2 and occurring as a liquid at 70° C. in an atmosphere of air. After filling, the vessel was placed in a drier maintained at 90° C. and allowed to stand there. After one week, this alkoxypolyalkylene glycol (2C2) had a peroxide value of 1.9 milliequivalents/g.

Esterification

The alkoxypolyalkylene glycol (2C2) was subjected to esterification in the same manner as described in Example 2 to give an 80% aqueous monomer mixture solution (MC2). During the above esterification reaction, a gel-like matter formed. When a portion of the 80% aqueous monomer mixture solution (MC2) was placed in a transparent glass bottle (200 ml) and observed by the eye, a gel-like floating matter was confirmed. Upon examination of a GPC chart, a small peak indicative of the presence of a high molecular fraction was also confirmed. The total amount of the gel-like matter formed during the esterification reaction was about 3 g.

Example 3

Storage

A SUS vessel was filled with 5 kg of the alkoxypolyalkylene glycol (5) obtained in Production Example 5 and occurring as a liquid at 120° C. After filling, nitrogen purging was carried out (⅙× three times) and the vessel was then tightly closed and allowed to stand at room temperature.

Two days later, the SUS vessel was placed in a drier maintained at 120° C. and allowed to stand for 9 hours to completely melt the contents. The thus-obtained alkoxypoly alkyleneglycol (5A3) had a hydroxyl value of 25.8 mg KOH/g, a PEG content of 8.5% by weight and an isoprene content of 1,645 ppm.

Polymerization

Then, a glass-made reaction vessel equipped with a thermometer, stirrer, dropping funnel, nitrogen inlet tube and reflux condenser was charged with 1,496 parts of the above alkoxypolyalkylene glycol (5A3), 131 parts of maleic anhydride and 1,090 parts of water and the reaction vessel inside was purged with nitrogen with stirring and the contents were heated in a nitrogen atmosphere to raise the water temperature to 60° C. Further, an aqueous solution of 6.2 parts of 2,2'-azobis(2-amidinopropane) dihydrochloride (trademark: NC-32W; product of Nippo Chemical) as polymerization initiator in 35.2 parts of water was added. Thereafter, the reaction temperature was maintained at 60° C. for 7 hours and then raised to 80° C. and maintained for 1 hour. The reaction mixture was neutralized top H7 with a 48% aqueous solution of sodium hydroxide to give an aqueous solution (A3) of a polymer having a weight average molecular weight of 26,300. A GPC chart of the aqueous polymer solution (A3) is shown in FIG. 1.

On a GPC chart of the aqueous polymer solution (A3), the proportion of trimer and higher polymers was 70%. The GPC chart of the aqueous polymer solution (A3) had no peak indicative of a high molecular fraction. A portion of the aqueous polymer solution (A3) was placed in a transparent glass bottle (200 ml) and observed by the eye; no gel-like matter was confirmed. In addition, no gel-like matter accumulation was confirmed in the strainer of the transfer pump.

Comparative Example 3

Storage

A SUS vessel was filled with 5 kg of the alkoxypolyalkylene glycol (5) obtained in Production Example 5 and occurring as a liquid at 120° C. After filling, nitrogen purging was carried out (⅙× three times) and the vessel was then tightly closed and maintained at 120° C. Two days later, this alkoxypolyalkylene glycol (5C3) had a hydroxyl value of 28.3 mgKOH/g, a PEG content of 17.3% by weight and an isoprene content of 3,725 ppm.

Polymerization

The polymerization was carried out in the same manner as described in Example 3 to give an aqueous solution (C3) of a polymer having a weight average molecular weight of 15,000. On a GPC chart of the aqueous polymer solution (C3), the trimer and higher polymer proportion was 50%.

The results of Examples 1 to 3 and Comparative Examples 1 to 3 are shown in Table 2.

TABLE 2

| | Example 1 | Comparative Example 1 | Example 2 | Comparative Example 2 | Example 3 | Comparative Example 3 |
|---|---|---|---|---|---|---|
| Alkoxypolyalkylene glycol species | Methoxypoly (n = 25) ethylene glycol | Methoxypoly (n = 25) ethylene glycol | Methoxypoly (n = 25) ethylene glycol | Methoxypoly (n = 25) ethylene glycol | 3-Methyl-3-buten-1-ol poly (n = 50) ethylene glycol adduct | 3-Methyl-3-buten-1-ol poly (n = 50) ethylene glycol adduct |
| Alkoxypolyalkylene glycol after storage | 2A1 POV = 0.25 | 2C1 POV = 1.3 | 2A2 POV = 0.20 | 2C2 POV = 1.9 | 5A3 PEG: 8.5% | 5C3 PEG: 17.3% |
| Aqueous monomer mixture solution | MA1 | MC1 | MA2 | MC2 | — | — |
| Aqueous polymer solution | A1 | — | — | — | A3(26,000) | C3(15,000) |
| Storage period | 1.5 months | 1.5 months | 1 week | 1 week | 2 days | 2 days |
| Amount stored | 19.5 t | 1.95 kg | 1.5 kg | 1.5 kg | 5 kg | 5 kg |

What is claimed is:

1. A storing and/or transferring method of an alkoxy(poly) alkylene glycol-containing material for cement additive polymer which comprises a step of filling a vessel, a step of storing and/or transferring and a step of drawing out, in that order, said alkoxy(poly)alkylene glycol being represented by the following general formula (1);

$$R^1O(R^2O)_nH \quad (1)$$

in the formula, $R^1$ represents a hydrocarbon group containing 1 to 30 carbon atoms, $R^2O$ group represents an oxyalkylene group containing 2 to 18 carbon atoms and each $R^2O$ group may be the same or different and n represents the average number of moles of the oxyalkylene groups represented by $R^2O$ as added and is a number of 2 to 300, and said step of storage and/or transfer being carried out at a temperature not higher than the solidifying point of the material for cement additive polymer.

2. The storing and/or transferring method of an alkoxy (poly)alkylene glycol-containing material for cement additive polymer according to claim 1, wherein said step of drawing out is carried out by melting said material for cement additive polymer at a temperature not lower than the solidifying point thereof.

3. The storing and/or transferring method of an alkoxy (poly)alkylene glycol-containing materials for cement additive polymer according to claim 2, wherein said step of filling the vessel is carried out by pressurization with an inert gas and tightly closing, and said step of drawing out is carried out by melting said material for cement additive polymer at a temperature not lower than the solidifying point thereof in a tightly closed state.

4. The storing and/or transferring method of an alkoxy (poly)alkylene glycol-containing material for cement additive polymer according to claim 3, wherein said step of drawing out is carried out by heating until the gaseous phase pressure reaches at a level higher than that at the time of tightly closing a vessel in the step of filling.

5. The storing and/or transferring method of an alkoxy (poly)alkylene glycol-containing material for cement additive polymer according to claim 1, wherein n in the general formula (1) is a number of 10 to 300.

6. The storing and/or transferring method of an alkoxy (poly)alkylene glycol-containing material for cement additive polymer according to claim 5, wherein said step of drawing out is carried out by melting said material for cement additive polymer at a temperature not lower than the solidifying point thereof.

7. The storing and/or transferring method of an alkoxy (poly)alkylene glycol-containing material for cement additive polymer according to claim 6, wherein said step of filling the vessel is carried out by pressurization with an inert gas and tightly closing, and said step of drawing out is carried out by melting said material for cement additive polymer at a temperature not lower than the solidifying point thereof in a tightly closed state.

8. The storing and/or transferring method of an alkoxy (poly)alkylene glycol-containing material for cement additive polymer according to claim 7, wherein said step of drawing out is carried out by heating until the gaseous phase pressure reaches at a level higher than that at the time of tightly closing a vessel in the step of filling.

* * * * *